R. FOUNTAIN.
FRUIT GATHERER.
APPLICATION FILED SEPT. 8, 1909.
959,332.
Patented May 24, 1910.
2 SHEETS—SHEET 2.
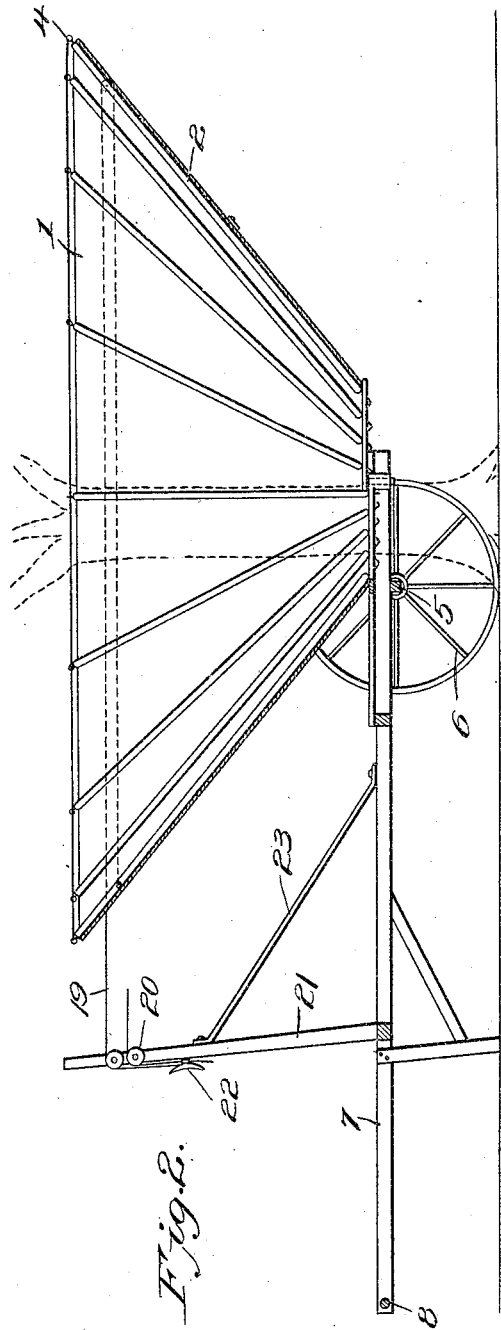
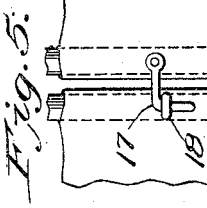
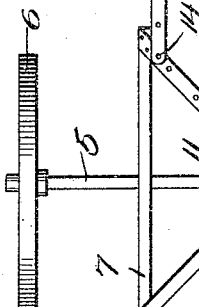
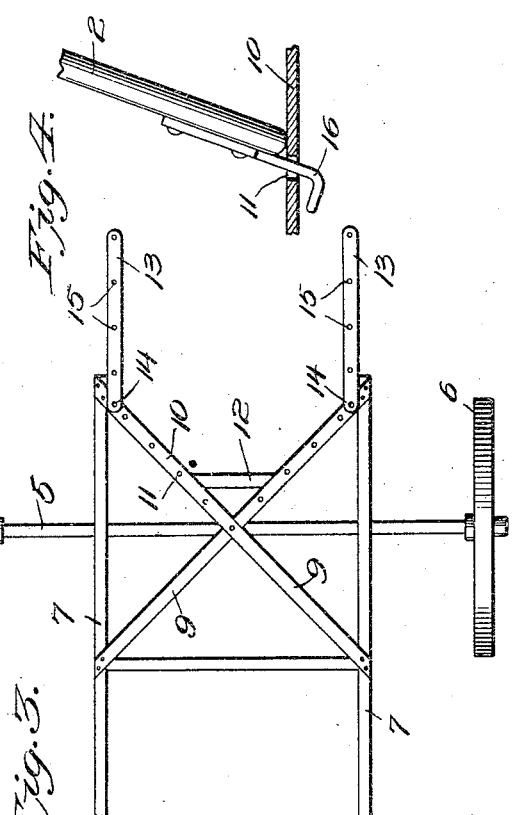
Witnesses
Edwin G. McKee
V. B. Hillyard.
Inventor
Robert Fountain
By Victor J. Evans
Attorney

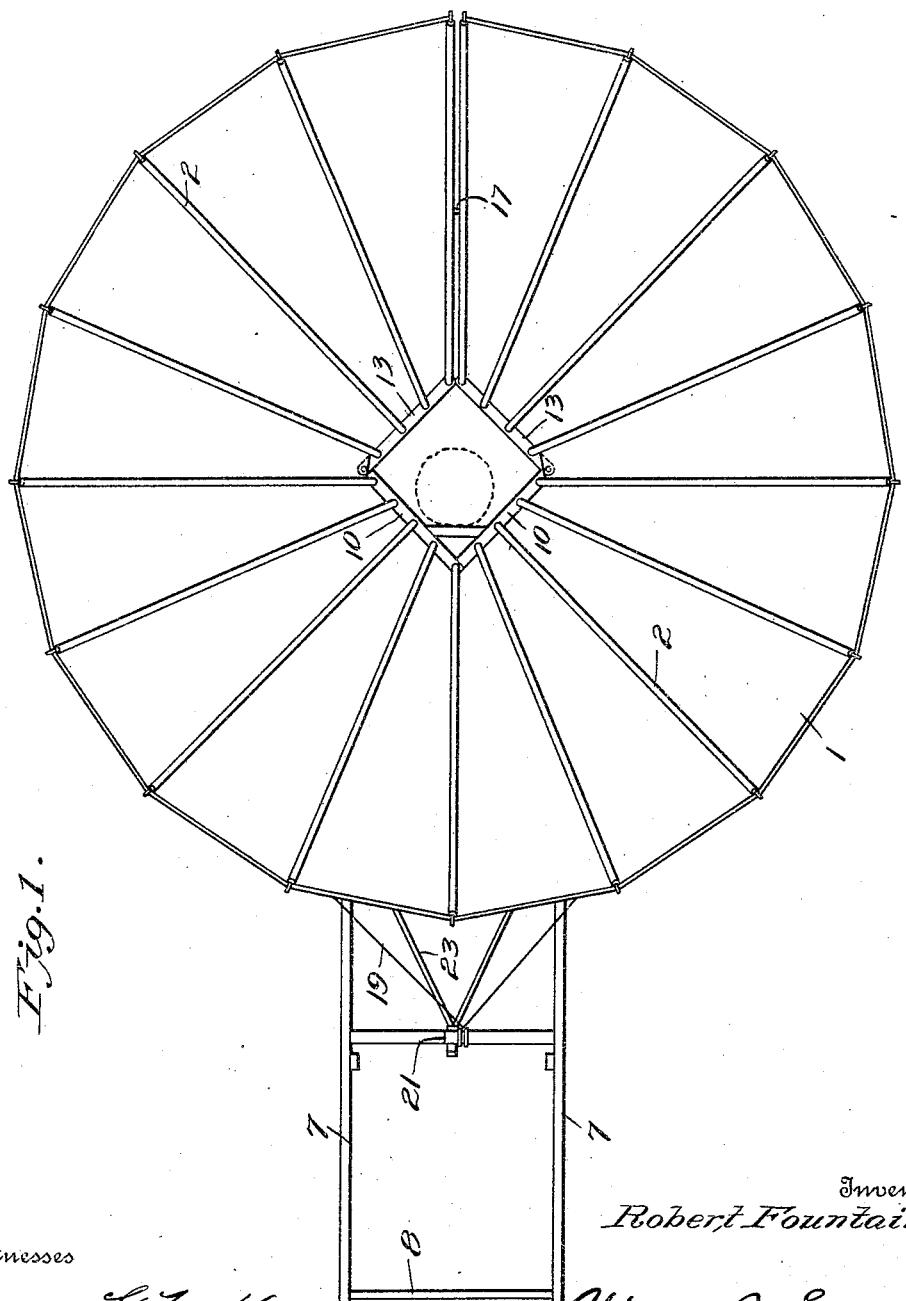

UNITED STATES PATENT OFFICE.

ROBERT FOUNTAIN, OF BANNING, CALIFORNIA.

FRUIT-GATHERER.

959,332. Specification of Letters Patent. Patented May 24, 1910.

Application filed September 8, 1909. Serial No. 516,793.

*To all whom it may concern:*

Be it known that I, ROBERT FOUNTAIN, a citizen of the United States, residing at Banning, in the county of Riverside and State of California, have invented new and useful Improvements in Fruit-Gatherers, of which the following is a specification.

The present invention has relation to means for gathering fruit, and has for its object to provide an appliance which may be readily transported in the orchard from one fruit tree to another and quickly placed in position about a tree so as to collect the fruit shaken from the limbs, and which may be easily and quickly folded and disconnected from the tree so as to be readily applied to the next tree whose fruit is to be collected.

The invention has for its object to supply a gatherer mounted upon a truck comprising a textile body of approximately funnel shape and strengthened by means of braces or stays and adapted to be spread or elevated more or less to suit the nature of the tree whose fruit is to be gathered.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of the gatherer as it appears when in position for collecting fruit. Fig. 2 is a vertical central longitudinal section of the gatherer, the dotted lines showing the trunk of the tree about which the gatherer is fitted. Fig. 3 is a top plan view of the truck, showing two of the bars open to admit of the passage of the trunk of the tree between them. Fig. 4 is a detail view, showing the manner of securing the lower end of one of the braces or stays to the frame. Fig. 5 is a detail view of the movable bars at the ends of the gathering body, showing the means for securing the same when brought together. Fig. 6 is a detail view of the upper portion of one of the braces or stays, having a portion of the textile body attached thereto and illustrating the rope passing through a guide eye at the upper end thereof.

Corresponding and like parts are referred to in the following description, and indicated in all the views of the drawings, by the same reference characters.

The gatherer proper is of funnel shape and comprises a body 1 of textile material, such as stout canvas, duck, or burlap. A series of braces or stays 2 stiffen and strengthen the textile body and are adapted to be connected at their upper ends by means of a rope 3, which passes through guide eyes 4 at the upper ends of the braces or stays. The textile forming the body of the gatherer may be attached to the braces or stays in any manner. The body of the gatherer may be of any diameter so as to insure collection of the fruit shaken from the tree. By having the body of the gatherer of funnel shape the fruit received thereon is directed to a central point where a suitable outlet is provided for the discharge of the fruit into a box or other receptacle.

The gatherer is mounted upon a truck, whereby it may be readily transported from one tree to another. The truck comprises an axle 5 and ground wheels 6. The truck frame may be of any construction, and, as shown, comprises longitudinal bars 7, which are extended at one end and connected by a cross rod 8 forming a handle. Cross bars 9 strengthen the longitudinal bars 7 and their diverged ends 10 forward of the axle 5 are formed with a series of openings 11 and are strengthened by means of a brace 12, which also serves as a stop to limit the forward movement of the truck when placed against a tree. Bars 13 are pivoted at 14 to the outer forward ends of the diverged portions 10 of the cross bars 9 and are provided with a series of openings 15. The pivot bars 13 when brought together, as indicated in Fig. 1, may be secured in any manner and together with the extensions 10 of the bars 9 inclose a space through which the trunk of the tree passes. The braces or stays 2 rest at their lower ends upon the parts 10 and 13, which form a supporting frame therefor. Hooks 16, provided at the lower ends of the braces or stays 2, pass through the openings of the frame bars and retain the braces 2 in position. This is shown most clearly in Fig. 4. When it is required to provide a passage for the tree either into or from the space inclosed by the frame bars, the pivot bars 13 are released and swung open into the position about as indicated in Fig. 3. After the gatherer has been placed in position about a tree the frame bars 13 are closed and fastened and the terminal braces 2 are likewise secured by a suitable fastening, as by means of a hook 17 and eye 18, as indicated most clearly in Fig. 5. The upper portion of the gatherer may be contracted by means of an operating rope or cord 19, which passes through eyes secured to the upper ends of the braces 2, the ends of the rope or cord 19 passing over guide rollers 20 near the upper end of a standard 21 and adapted to be secured by means of a cleat 22, or in any other suitable way. The standard 21 is secured at its lower end to the framework of the truck and is stayed by means of braces 23.

In the use of the invention the gatherer is spread and the end braces 2 and the pivot bars 13 are drawn back to admit of the truck being advanced so as to receive the trunk of the tree into the space formed between the diverged ends 10 of the bars 9, after which pivot bars 13 are closed and secured and the end braces 2 brought together and fastened, thereby completing the closure of the gatherer about the tree. The spread of the gatherer may be regulated by operating the rope or cord 19. By vigorously shaking the tree or the branches thereof the fruit is dislodged and dropping upon the gatherer is directed to the center thereof and escapes by way of the outlet into the box or other receptacle arranged to receive the same. After the tree has been stripped the end bars and the pivot bars 13 are opened, thereby admitting of backing the truck so as to disengage the gatherer from the tree, after which the device may be placed in position about the next tree to be stripped of its fruit. The construction is such that when the gatherer is not required for immediate use it may be folded into compact form and placed upon the truck so as to be stored and occupy a minimum amount of space.

From the foregoing description, taken in connection with the accompanying drawings, the advantages of the construction and of the method of operation will be readily apparent to those skilled in the art to which the invention appertains, and while I have described the principal of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:

1. In combination with a supporting frame provided with openings, a textile body, braces for said textile body having their lower ends resting upon said supporting frame, and hooks at the lower ends of said braces passing through the openings of the supporting frame and engaging the lower surface thereof to hold the braces in position thereon against both vertical and lateral displacement.

2. In combination a truck comprising a supporting frame, a standard projected upward from the truck, a textile body, braces sustaining the textile body and mounted upon said supporting frame, an operating cord having running connection with the upper ends of said braces for contracting the textile body and directed by said standard in its running movements, and means for securing the operating cord to hold the textile body and braces in an adjusted position.

In testimony whereof I affix my signature in presence of two witnesses.

ROBERT FOUNTAIN.

Witnesses:
C. A. REID,
S. S. CUTLER.